United States Patent [19]

Ono et al.

[11] 4,334,315
[45] Jun. 8, 1982

[54] WIRELESS TRANSMITTING AND RECEIVING SYSTEMS INCLUDING EAR MICROPHONES

[75] Inventors: Hiroshi Ono, Tokyo; Kazutoshi Mizoi, Mie, both of Japan

[73] Assignee: Gen Engineering, Ltd., Japan

[21] Appl. No.: 146,675

[22] Filed: May 5, 1980

[30] Foreign Application Priority Data

May 4, 1979 [JP] Japan ................................. 54-55096

[51] Int. Cl.³ .......................... H04B 7/15; H04B 1/38
[52] U.S. Cl. ....................................... 455/11; 455/41; 455/89; 455/100; 455/351; 179/107 BC
[58] Field of Search ................... 455/11, 7, 41, 54, 89, 455/100, 351; 179/107 R, 107 E, 107 BC, 107 H, 157, 156 R, 102, 182 R

[56] References Cited

U.S. PATENT DOCUMENTS

| | | | |
|---|---|---|---|
| 2,535,063 | 12/1950 | Halstead | 179/102 |
| 3,258,533 | 6/1966 | Bredon | 179/107 E |
| 3,819,860 | 6/1974 | Miller | 179/182 R |
| 3,868,572 | 2/1975 | Kaufman et al. | 455/89 |
| 3,869,584 | 3/1975 | Wilde | 179/156 R |
| 4,150,262 | 4/1979 | Ono | 179/107 BC |

Primary Examiner—Jin F. Ng
Attorney, Agent, or Firm—Roylance, Abrams, Berdo & Farley

[57] ABSTRACT

A wireless transmitting and receiving system includes an ear microphone of the vibration pick-up type for picking up bone-conducted voice signals through an external auditory ear canal wall of a wearer. A portable case is disposed adjacent the wearer's ear and a wireless device is attached adjacent the wearer but spaced from the portable case. A transmitter of a transmitting circuit for transmitting the output signals of the ear microphone is housed in the portable case. A receiver of a receiving circuit is housed in the wireless device and receives signals from outside the system. The transmitting and receiving circuits provide a wireless connection between the portable case and the wireless device permitting two-way communication through one ear of the wearer.

10 Claims, 12 Drawing Figures

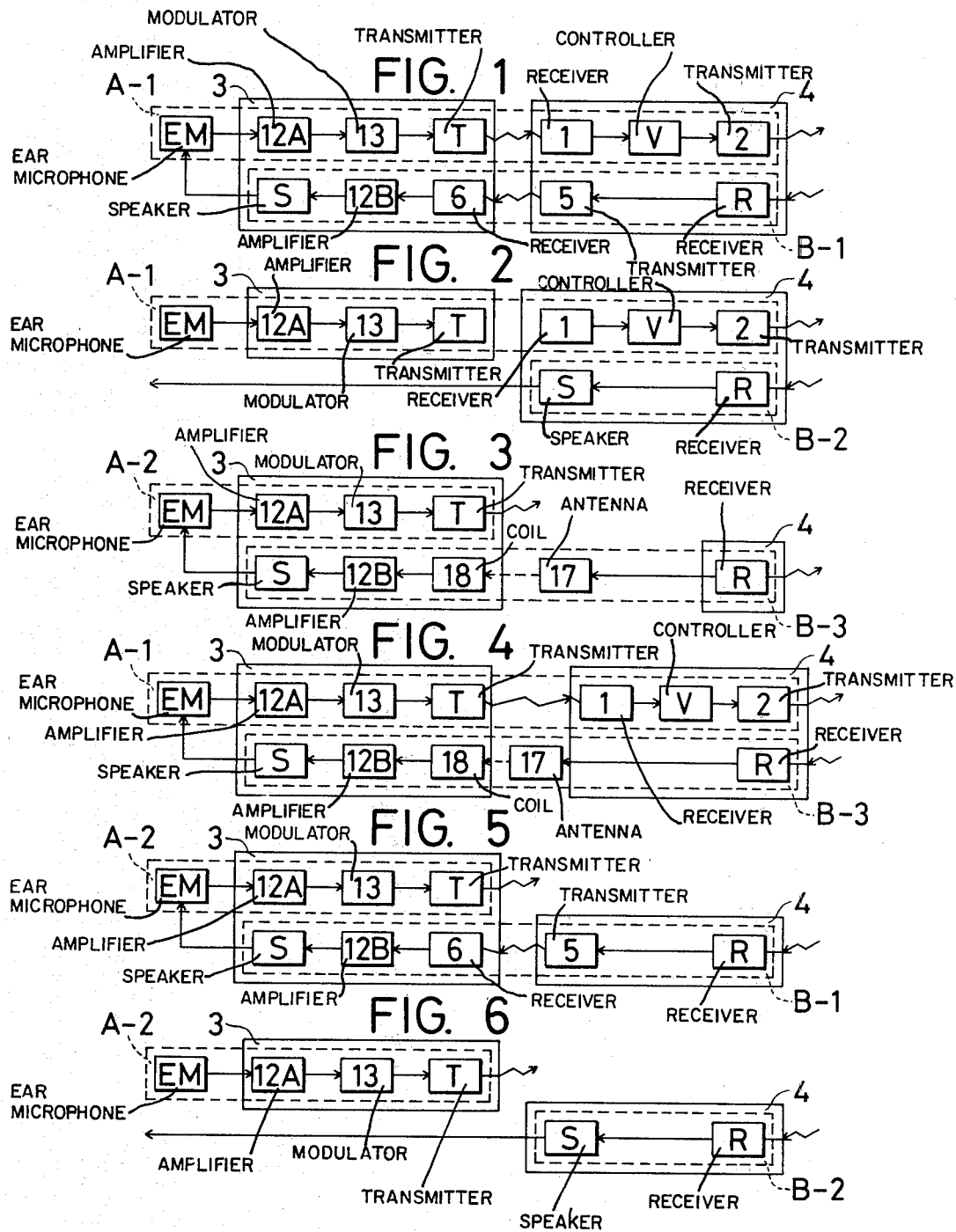

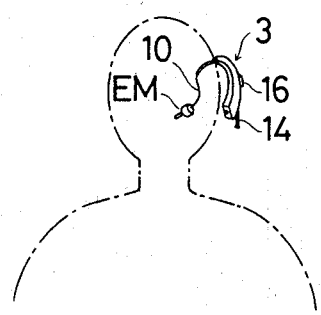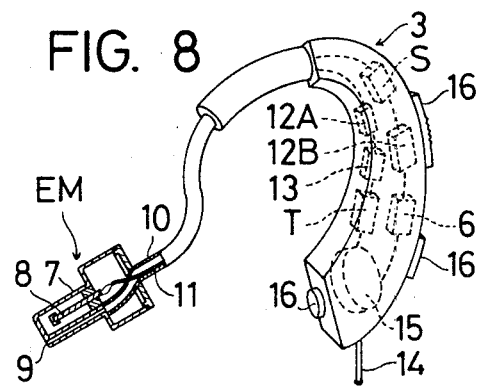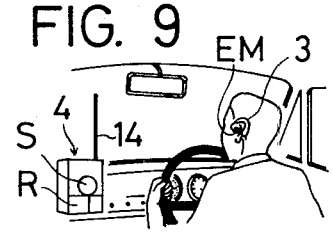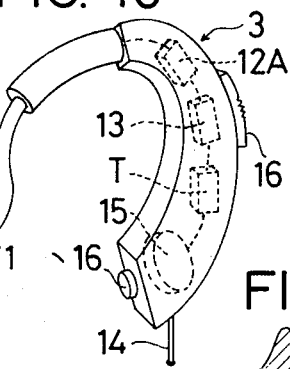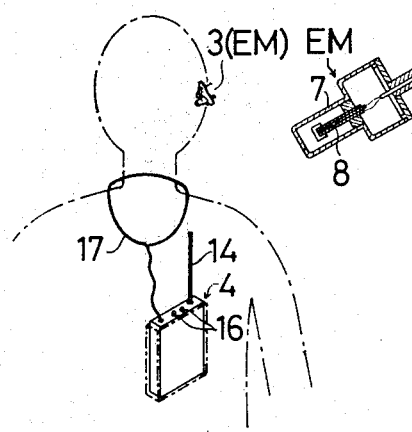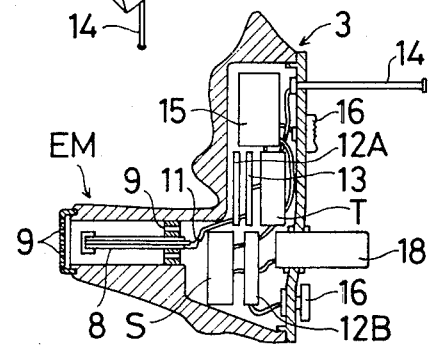

WIRELESS TRANSMITTING AND RECEIVING SYSTEMS INCLUDING EAR MICROPHONES

The present invention relates to wireless transmitting and receiving system including ear microphones of vibration pick-up type. Such systems may comprise transmitting and receiving circuits and are wireless with transmission and reception being attained through one ear of an ear microphone wearer.

An ear microphone of vibration pick-up type (which is hereinafter referred to as ear mic) may be fitted into the external auditory canal of one ear of the wearer to pick up the voice signals (or vibrations) conducted through his bones in the external auditory canal wall. An ear mic as described above has been publicly disclosed by Hiroski ONO, one of the inventors of the present invention, U.S. Pat. No. 4,150,262. This ear mic can be combined with a speaker such as the usual earphone of sound pressure type.

Arrangements to transmit and receive through a wireless system (which includes the electromagnetic induction type) use the ear mic as the transmitting system and the speaker as a receiving system. In this system a lead wire for supplying the output of the ear mic was connected to the usual wireless means such as two way radio, a cord of the sound pressure type earphone was connected to the same wireless means, the sound pressure type earphone was connected to the ear mic, and the ear mic provided with the earphone was fitted into the external auditory canal of one ear of a wearer. As the result, although wireless communication of transmission and reception was achieved, the noises of the lead wire and cord extending from the ear mic provided with the earphone were picked up by the ear mic because the ear mic was of vibration pick-up type. Thus, it was found that the cord noises wirelessly transmitted made the voice transmitted sound obscure. In addition, this lead wire and cord connecting the ear mic, provided with the earphone and fitted into the external auditory canal of one ear of the wearer, to the wireless means attached to the waist or the like of the wearer hindered free movement of the wearer.

According to the invention, there is provided a wireless transmitting and receiving system comprising an ear microphone of vibration pick-up type for picking up bone-conducted voice signals through the external auditory canal wall of an ear microphone wearer, a portable case supportable adjacent an ear of the wearer, and a wireless device supportable adjacent the wearer but spaced from the case and ear microphone. A transmitting circuit includes a transmitter for transmitting output signals of the ear microphone housed in the portable case. A receiving circuit includes a receiver for receiving signals transmitted from outside the system housed in the wireless device. The transmitting and receiving circuits provide a wireless connection between the portable case and the wireless device such that transmission and reception may be achieved through the one ear of the wearer in which the ear microphone is inserted.

According to preferred embodiments of the invention, it is possible to provide a wireless transmitting and receiving system using an ear mic capable of meeting the following requirements:

(1) By using the ear mic in the transmitting circuit, noises can be excluded and clear voice sounds can be transmitted when used under highly noisy circumstances;

(2) By combining the ear mic with a speaker of the receiving circuit, transmission and reception can be achieved through at least one ear of the wearer leaving his hands free for doing anything he wants;

(3) By employing in the transmitting and receiving circuits a wireless system, the ear mic can avoid picking up the cord noises;

(4) By using a wireless system, the wearer is allowed to freely move; for example, the driver in a car in which the wireless system is provided can drive the car feeling no limitation to his movement, such car may be a wireless communication car, a patrol car, or a telephone car and the like, which drivers operate with part of the wireless system attached to their waists to permit them to work freely while communicating with each other for instance on a construction site;

(5) The wireless system may use a conventional FM transmitter, receiver, transceiver, CB set, two way radio or the like, which are readily available;

(6) During the operation of transmission and reception either of the ears of the wearer may be left open to hear sounds from outside, thus improving security to the wearer.

The present invention will be further described, by way of example, with reference to the accompanying drawings, in which like reference numerals refer to like parts, and in which:

FIGS. 1 through 6 are block diagrams showing respective embodiments of the present invention;

FIG. 7 is a perspective view of the embodiment of FIG. 1 showing a portable transmitting and receiving case and wireless device attached to the ear and the waist band of the wearer, respectively;

FIG. 8 is a perspective view, partly cut away, of a portable transmitting and receiving case of ear hanging type shown in FIG. 7;

FIG. 9 is a perspective view of the embodiment of FIG. 2 showing a portable transmitting case of ear hanging type and the wireless device arranged in a car;

FIG. 10 is a perspective view, partly cut away, of a portable transmitting case of the ear hanging type shown in FIG. 9;

FIG. 11 is a perspective view of the embodiment of FIG. 3 showing a portable transmitting and receiving case fitted into the external auditory canal and the wireless means provided with a loop antenna housed in a breast pocket of the wearer; and FIG. 12 is a sectional view of the portable transmitting and receiving case shown in FIG. 11.

EMBODIMENT 1:

As shown in FIGS. 1, 7 and 8, the transmitting circuit A-1 comprises a transmitter T, a receiver 1 for receiving signals transmitted from the transmitter T, and a second transmitter 2 for external transmission of the output signals of the receiver 1. The transmitter T is housed in portable ear hanging case 3, and the receiver 1 and second transmitter 2 are housed in a wireless device 4.

A receiving circuit B-1 comprises a receiver R, a transmitter 5 for transmitting output signals of the receiver R, a second receiver 6 for receiving the signals transmitted from the transmitter 5, and a speaker S for acoustically converting the output signals of the second receiver 6 and supplying them as outputs. The receiver R and transmitter 5 are housed in the wireless device 4. The second receiver 6 and speaker S are housed in the ear hanging portable case 3.

An ear microphone (EM) comprises a microphone body 7 loosely inserted into the external auditory canal so as not to cause a blocking effect of the canal, a vibration pick-up element 8 such as a piezo-electric element supported by the body 7, and a sound passage 9. The microphone body 7 is connected to the ear hanging portable case 3 through a sound tube 10, which serves to introduce the outputs of the sound pressure type speaker S to the microphone body 7. The sound tube 10 contains therein a lead wire 11 for supplying the electrical output of the pick-up element 8.

In the Figures, numerals 12A and 12B represent amplifiers, 13 an FM modulator, 14 an antenna, 15 a power source, 16 a switch and V a voice-operated controller. The wireless device 4 used in this embodiment may comprise conventional two way radio combined with the receiver and transmitter.

Bone-conducted voice signals picked up by the ear mic EM are supplied through the lead wire 11 and are amplified by the amplifier 12A, and then FM-modulated by the FM modulator 13, and are transmitted by the transmitter T. The transmitted signals are received by the receiver 1 and transmitted outside the system by the second transmitter 2. The signals transmitted from outside the system are received by the receiver R and again transmitted by the transmitter 5. The transmitted signals of this receiving system are received by the second receiver 6, amplified by the amplifier 12B and acoustically converted by the speaker S. The sounds thus produced are introduced through the sound tube 10 to the mic body 7 and are heard through the sound passage 9.

EMBODIMENT 2:

In the embodiment shown in FIGS. 2, 9 and 10, the transmitting circuit A-1 is the same as that of the embodiment of FIG. 1. A receiving circuit B-2 includes a receiver R housed in the wireless device 4 and a speaker S for acoustically converting the signals of the receiver R. The wherein the output sounds are heard through the ear into which the ear mic EM is inserted and the other ear of the wearer. The wireless device 4 used in this embodiment may be a conventional CB (citizen's band) set combined with the receiver.

EMBODIMENT 3:

In the embodiment shown in FIGS. 3, 11 and 12, the transmitting circuit is housed in a portable case, which is inserted into the external auditory canal, and includes a transmitter T for transmitting outside the system the output signal of the ear mic EM.

The receiving circuit B-3 comprises a receiver R, a loop antenna 17 for electromagnetically inducing output signals of the receiver R, an induction coil 18 electromagnetically coupled to the loop antenna 17, and a speaker S for acoustically converting the output signals of the induction coil 18. The receiver R is housed in the wireless device 4. The loop antenna 17 is connected to the wireless device 4 and extends adjacent to the portable case 3. The induction coil 18 and speaker S are included in the portable case 3. The wireless means used in this embodiment may be a conventional AF receiver or the like.

The portion corresponding to the ear mic of the portable case may be shielded with a sound passage 9 provided around the ear mic EM.

In the transmitting circuit A-2 the outputs of the ear mic EM are amplified, FM-modulated and directly transmitted outside the system by the transmitter T.

In the receiving circuit B-3 the signals transmitted from outside the system and and received by the receiver R are electromagnetically induced by the loop antenna 17 in the induction coil 18, amplified by the AF amplifier 12B, and then supplied as output via the speaker S.

EMBODIMENT 4:

In the embodiment shown in FIG. 4, the transmitting circuit A-1 is the same as that of the embodiment of FIG. 1 and the receiving circuit B-1 is the same as that of the embodiment of FIG. 3. Therefore, the function of this embodiment is the same in the transmitting line circuit A-1 as that in the embodiment of FIG. 1 and the same in the receiving circuit B-3 as that in the embodiment of FIG. 3.

EMBODIMENT 5:

In the embodiment shown in FIG. 5, the transmitting circuit A-2 is the same as that of the embodiment of FIG. 3 and the receiving circuit B-1 is the same as that of the embodiment of FIG. 1.

Accordingly, the function of this embodiment the same in the transmitting circuit A-2 as that in the embodiment of FIG. 3 and same in the receiving circuit B-1 as that in the embodiment of FIG. 1.

EMBODIMENT 6:

In the embodiment shown in FIG. 6, the transmitting circuit A-2 is the same as that of the embodiment of FIG. 3 and the receiving circuit B-2 is the same as that of the embodiment of FIG. 2.

Accordingly, the function of this embodiment is same in the transmitting circuit A-2 as that in the embodiment of FIG. 3 and same in the receiving circuit B-2 as that in the embodiment of FIG. 2.

Though the present invention has been described with reference to the embodiments shown in the accompanying drawings, the portable case 3 may be of ear hanging type shown in FIGS. 7 and 10, of the external auditory canal insertion type shown in FIG. 12, or may be of helmet type, spectacles frame type, or shoulder attachment type.

While certain advantageous embodiments have been chosen to illustrate the invention, it will be understood by those skilled in the art that various changes and modifications can be made therein without departing from the scope of the invention as defined in the appended claims.

What is claimed is:

1. A wireless transmitting and receiving system for use in two-way communication with a remote transmitter-receiver, comprising
   an ear microphone for picking up bone-conducted voice signals through an external auditory canal wall of one ear of a wearer thereof;
   a portable case having first mounting means for supporting said portable case adjacent the one ear of the wearer, and housing a first transmitter;
   a wireless device having second mounting means for supporting said wireless device adjacent the wearer but spaced from said portable case and said ear microphone, and housing a second transmitter and first and second receivers;
   said transmitters and receivers forming a communication loop including
   a first link with said first transmitter for transmitting output signals of said ear microphone, said second receiver for receiving signals transmitted from said first transmitter and said second transmitter for transmitting signals received by said second receiver to the remote transmitter-receiver; and a second link with said first receiver for receiving signals transmitted from the remote transmitter-receiver;

whereby said first and second links provide a wireless connection between said portable case and said wireless device and permit wireless communication signals to be transmitted and received between the one ear of the wearer in which said ear microphone is mounted and the remote transmitter-receiver.

2. A wireless transmitting and receiving system according to claim 1, wherein said second link comprises a third transmitter for transmitting output signals of said first receiver, a third receiver receiving signals transmitted from said third transmitter, and a speaker for acoustically converting output signals of said third receiver; said third transmitter being housed in said wireless device; said third receiver and said speaker being housed in said portable case.

3. A wireless transmitting and receiving system according to claim 1, wherein said second link comprises a speaker housed in said wireless device, the speaker acoustically converting output signals of said first receiver to signals audible by the one ear of the wearer in which said ear microphone is mounted and by the other ear of the wearer.

4. A wireless transmitting and receiving system according to claim 1, wherein said second link comprises a loop antenna for electromagnetically inducing output signals of said first receiver, an induction coil electromagnetically coupled to said loop antenna, and a speaker for acoustically converting output signals of said induction coil; said antenna being connected to said wireless device and extending adjacent to said portable case; said induction coil and said speaker being housed in said portable case.

5. A wireless transmitting and receiving system according to claim 1, wherein said portable case is of ear hanging type.

6. A wireless transmitting and receiving system according to claim 1, wherein said portable case is of the external auditory canal insertion type.

7. A wireless transmitting and receiving system for use in two-way communication with a remote transmitter-receiver, comprising an ear microphone for picking up bone-conducted voice signals through an external auditory canal wall of one ear of a wearer thereof;

a portable case having first mounting means for supporting said portable case adjacent the one ear of the wearer, and housing a first transmitter, a first receiver and a speaker;

a wireless device having second mounting means for supporting said wireless device adjacent the wearer but spaced from said portable case and said ear microphone, and housing a second receiver and a second transmitter;

said transmitters, receivers and speaker forming a communication loop including a first link with said first transmitter for transmitting output signals of said ear microphone to the remote transmitter-receiver; and a second link with said second receiver for receiving signals transmitted from the remote transmitter-receiver, said second transmitter for transmitting output signals of said second receiver, said first receiver for receiving signals transmitted from said second transmitter, and said speaker for acoustically converting output signals of said first receiver;

whereby said first and second links provide a wireless connection between said portable case and said wireless device and permit wireless communication signals to be transmitted and received between the one ear of the wearer in which said ear microphone is mounted and the remote transmitter-receiver.

8. A wireless transmitting and receiving system according to claim 7, wherein said ear microphone is connected through a sound tube to said portable case and sound outputs of said speaker are introduced through said sound tube to said ear microphone.

9. A wireless transmitting and receiving system for use in two-way communication with a remote transmitter-receiver, comprising an ear microphone for picking up bone-conducted voice signals through an external auditory canal wall of one ear of a wearer thereof;

a portable case having first mounting means for supporting said portable case adjacent the one ear of the wearer, and housing a first transmitter, a speaker and an induction coil;

a wireless device having second mounting means for supporting said wireless device adjacent the wearer but spaced from said portable case and said ear microphone, housing a first receiver and having a loop antenna connected thereto and extending adjacent to said portable case;

said transmitter, speaker, induction coil, receiver and antenna forming a communication loop including a first link with said first transmitter for transmitting output signals of said ear microphone to the remote transmitter-receiver; and a second link with said first receiver for receiving signals transmitted from the remote transmitter-receiver, said antenna for electromagnetically inducing output signals of said first receiver, said induction coil electromagnetically coupled to said loop antenna, and said speaker for acoustically converting output signals of said induction coil;

whereby said first and second links provide a wireless connection between said portable case and said wireless device and permit communication signals to be transmitted and received between the one ear of the wearer in which said ear microphone is mounted and the remote transmitter-receiver.

10. A wireless transmitting and receiving system according to claim 9, wherein said ear microphone is connected through a sound tube to said portable case and sound outputs of said speaker are introduced through said sound tube to said ear microphone.

* * * * *